United States Patent [19]

Hanyuh

[11] Patent Number: 5,701,363
[45] Date of Patent: Dec. 23, 1997

[54] BINARY TO MULTI-VALUE CONVERSION APPARATUS FOR IMPROVED IMAGE REDUCTION AND ENLARGEMENT

[75] Inventor: Yoshiaki Hanyuh, Soka, Japan

[73] Assignee: Ricoh Company, Ltd., Tokyo, Japan

[21] Appl. No.: 262,058

[22] Filed: Jun. 17, 1994

[30] Foreign Application Priority Data

Jun. 18, 1993 [JP] Japan .................. 5-147819

[51] Int. Cl.⁶ .................................. H04N 1/409
[52] U.S. Cl. ............... 382/174; 382/292; 258/462; 258/464
[58] Field of Search ............... 358/464, 462, 358/467, 463, 456, 447, 448, 452, 465, 466, 451; 382/254, 260, 261, 263, 264, 266, 291, 292, 174–176; H04N 1/409

[56] References Cited

U.S. PATENT DOCUMENTS

| 4,110,795 | 8/1978 | Spencer . | |
|---|---|---|---|
| 4,194,221 | 3/1980 | Stoffel . | |
| 5,023,919 | 6/1991 | Wataya | 382/54 |
| 5,130,820 | 7/1992 | Hirota | 358/447 |
| 5,134,667 | 7/1992 | Suzuki | 358/520 |
| 5,166,810 | 11/1992 | Sorimachi et al. | 358/462 |
| 5,231,677 | 7/1993 | Mita et al. | 358/462 |
| 5,410,619 | 4/1995 | Fujisawa et al. | 382/54 |
| 5,539,843 | 7/1996 | Murakami et al. | 358/456 |

FOREIGN PATENT DOCUMENTS

| 0041400 | 12/1981 | European Pat. Off. . |
|---|---|---|
| 4-186486 | 7/1992 | Japan . |

OTHER PUBLICATIONS

Publication entitled "Digitale Bildverarbeitung" by Peter Haberacker dated 1989, pp. 182–187 (English paragraph attached).

*Primary Examiner*—Kim Vu
*Attorney, Agent, or Firm*—Woodcock Washburn Kurtz Mackiewicz & Norris LLP

[57] ABSTRACT

An image processing apparatus is disclosed. The image processing apparatus incorporates an input device which inputs binary image data, a divider which divides the input binary image data into binary text/drawing data and binary photograph/graphics data, a multi-value processor in which the binary text/drawing data is converted to multi-value text/drawing data by a filter which interpolates an edge of an image and the binary photograph/graphics data is converted to multi-value photograph/graphics data by a filter which smooths an image, a mixer which mixes the multi-value text/drawing data and the multi-value photogaph/graphics data together into multi-value data, and an output device which outputs the multi-value data. In accordance with this invention, improved output images can be produced in which, for example, jagged images are reduced and faithful reproductions of an orignal image are achieved.

8 Claims, 6 Drawing Sheets

FIG. 6a $$\frac{255}{9}\begin{pmatrix}1 & 1 & 1\\ 1 & 1 & 1\\ 1 & 1 & 1\end{pmatrix}$$

FIG. 6b

FIG. 6c $p = a \cdot (1-x) \cdot (1-y) + b \cdot x \cdot (1-y) + c \cdot (1-x) \cdot y + d \cdot x \cdot y$

|   |   |   |    |
|---|---|---|----|
| 1 | 9 | 3 | 11 |
| 13| 5 |15 | 7  |
| 4 |12 | 2 |10  |
| 16| 8 |14 | 6  |

BINARY TO MULTI-VALUE CONVERSION APPARATUS FOR IMPROVED IMAGE REDUCTION AND ENLARGEMENT

BACKGROUND OF THE INVENTION

1. Field of the Invention

The present invention relates to an image apparatus, such as a digital copying machine, a printer, etc., which inputs binary image data and outputs multi-value image data. The invention particularly relates to an image processing apparatus that divides input image data into text/drawing image data and photograph/graphics image data, and executes multi-value processing with filters applied in accordance with characteristics of those images.

2. Discussion of the Background

Figure 13:
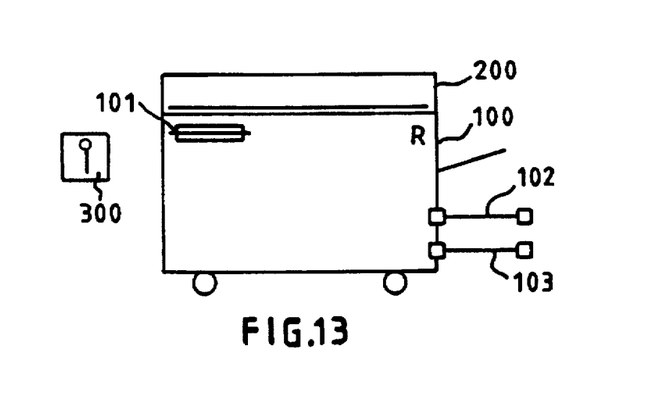
FIG. 13 is a schematic diagram showing a typical system of a digital copying machine.

FIG. 13 shows a typical system of a digital copying machine. In FIG. 13, number 100 is a printer block, number 101 is a floppy disk drive in which a floppy disk 300 is set. Number 102 is a general I/F such as an SCSI I/F, etc., number 103 is a modem and number 200 is a scanner.

In the system, the floppy disk drive 101 reads data on the floppy disk 300 which stores document data made in a computer and a printer block 100 prints it. Moreover, the printer block 100 receives data from the general I/F and prints it. It also receives data of a facsimile document from the modem and prints it.

In conventional systems, such as digital copying machines, printers, etc., the following problems occur.

For example, in some conventional systems which output binary image data, a jagged image for example cannot be reduced in a text/drawing image. In a photograph/graphics image, a rough image for example is outputted because uniform half tone images are represented by black dots and white dots.

Moreover, if the resolution of the recording engine in the printer block 100 is 400 dpi, enlargement processes of 167% and 133% are executed repectively on emulation images of 240 dpi and 300 dpi. In some conventional systems which output binary image data, techniques such as the simple decimation magnification method, SPC magnification method, smoothing magnification method, etc. are used when magnification is executed. In such cases, jagged images appear worse in an enlarged text/drawing image, more noise occurs in uniform half tone images, and both small text and narrow lines appear broken.

On the other hand, there are many other conventional systems which output multi-value image data. Such systems are designed to obtain high quality images by using the characteristics of a multi-value output engine. In a digital copying machine, the magnification in a horizontal direction (main scanning direction) is executed by pixel conversion, and the magnification in a vertical direction (sub-scanning direction) is executed by the scanning speed of a scanner. However, in conventional printers, though the magnification in a horizontal direction (main scanning direction) is executed by pixel conversion the same as in a digital copying machine, the magnification in a vertical direction (sub-scanning direction) cannot be executed.

SUMMARY OF THE INVENTION

It is a first object of the present invention to provide an image processing apparatus which inputs binary image data and outputs multi-value image data, and which obtains an improved output image having, for example, fewer jagged images thereby producing a faithful reproduction of the inputted images. The improved output image is achieved by converting binary image data to output multi-value image data with filters applied in accordance with the characteristics of either a text/drawing image or a photograph/graphics image.

It is another object of the present invention to provide an image processing apparatus which inputs binary image data and outputs multi-value image data and which executes magnification in both the horizontal direction (main scanning direction) and the vertical direction (sub-scanning direction) thereby suppressing image loss.

These and other objects and advantages are achieved by the present invention which provides for an image processing apparatus which inputs binary image data and outputs multi-value image data. The present invention comprises an input device which inputs binary image data, a divider which divides the input binary image data into binary text/drawing data and binary photograph/graphics data, a multi-value processor in which the binary text/drawing data is converted to multi-value text/drawing data by a filter which interpolates an edge of an image and the binary photograph/graphics data is converted to multi-value photograph/graphics data by a filter which smooths an image, a mixer which mixes the multi-value text/drawing data and the multi-value photograph/graphics data together into multi-value data, and an output device which outputs the multi-value data.

BRIEF DESCRIPTION OF THE DRAWINGS

In describing a preferred embodiment of the present invention illustrated in the drawings, specified terminoloy is employed for the sake of clarity. However, the invention is not intended to be limited to the specific terminology so selected, and it is to be understood that each specific element includes all technical equivalents which operate in a similar purpose.

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, embodiments of the invention will be described.

Figure 1:
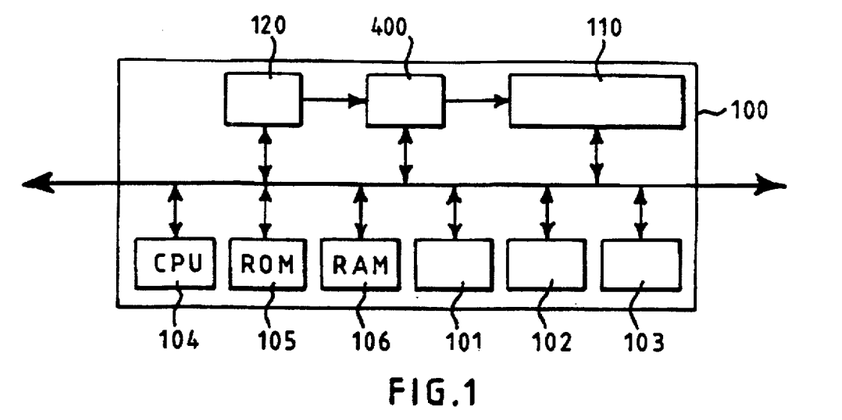
FIG. 1 is a block diagram of a printer block of the present invention.

FIG. 1 is a block diagram of a printer block 100 of the present invention. Binary image data is inputted from a floppy disk drive 101, a general I/F 102 or a modem 103, and is outputted to a memory 120. Then it is inputted to a converter which converts binary image data to multi-value data and to a magnifier 400. It is then printed in a multi-value data engine 110. Number 104 is a CPU, number 105 is a ROM, and number 106 is a RAM.

Figure 2:
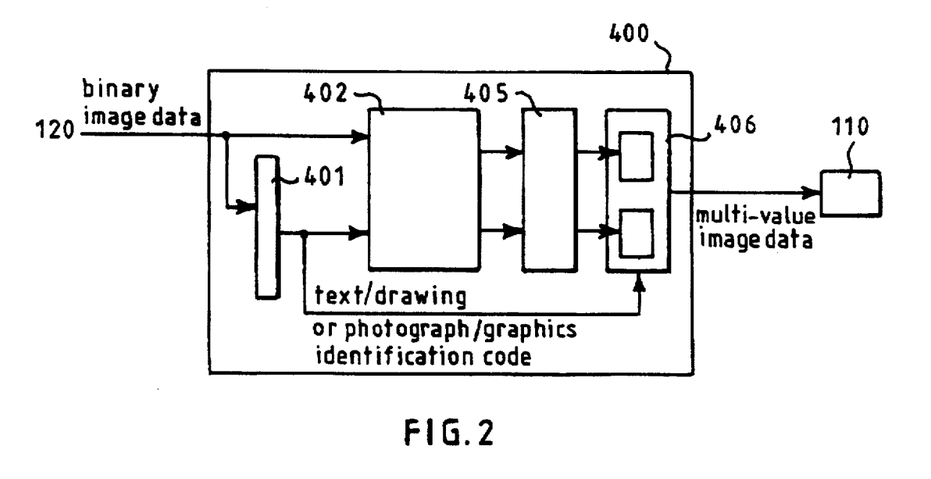
FIG. 2 is a block diagram of a converter of binary data to multi-value data, and a magnifier of a first embodiment.

FIG. 2 is a block diagram of a converter from binary image data to multi-value image data and the magnifier 400 of a first embodiment. Binary image data in the memory 20 is identified as either text/drawing data or photograph/graphics data in a binary image data identifier 401. An identification code signaling either text/drawing data or photograph/graphics data is outputted therefrom. On the basis of the code, the binary image data from the memory 120 is divided into text/drawing data and photograph/graphics data, and processed respectively to text/drawing data and photograph/graphics data of multi-value in a multi-value processor 402. Then the multi-value image data is magnified in a multi-value magnifier 405 and then the magnified multi-value image data is processed by multi-value gradation in a multi-value gradation device 406. Finally, the image data is transmitted to a multi-value engine 110, and then is printed.

Furthermore, the detail of each block will be described.

Figure 3:
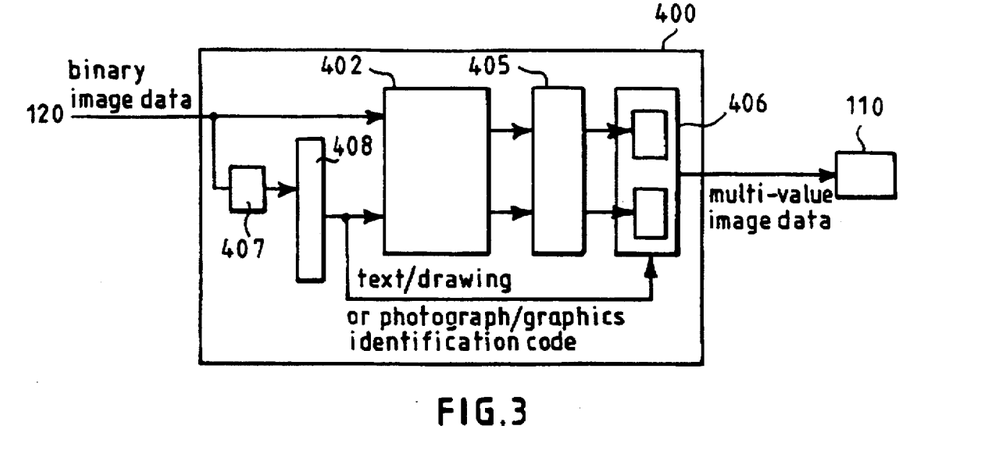
FIG. 3 is a block diagram of the converter of binary data to multi-value data, and the magnifier block of a second embodiment.
Figure 4:
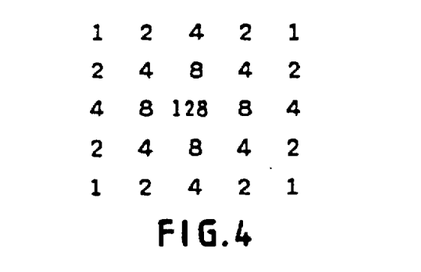
FIG. 4 shows a matrix of an input filter used in the second embodiment.

First, some companies propose many kinds of methods about dividing and identifying processes for binary image data in the binary image data identifier 401. For example, the edge dividing process, halftone dividing process and white area detecting processes are known. On the other hand, in a digital copying machine, the dividing and identifying process for multi-value image data which is already installed in a digital copying machine can be used without using the dividing and identifying process for binary image data. This process will be described in FIGS. 3 as a second embodiment. FIG. 3 is a block diagram of a converter of binary image data to multi-value image data, and a magnifier 400 of a second embodiment. FIG. 4 shows a matrix of an input filter 407 used in the second embodiment.

In this embodiment, binary data from the memory 120 is processed into multi-value image data in the filter 407 which has the reading characteristic of a CCD for a scanner. The multi-value image data from the filter 407 is identified as text/drawing data or photograh/graphics data in a multi-value data identifier 408, and an identification code is outputted therefrom. On the basis of the code, the inputted binary image data from the memory 120 is divided into text/drawing data and photograph/graphics data, and is processed respectively as text/drawing data and photograph/graphics data of multi-value data in a multi-value processor 402. This method is not effective in an ordinary printer because ordinary printers do not have such a filter. However, the method is effective in reducing the developing cost of a new filter in this system of the present invention or a digital copying machine because they have already such a filter.

Next, the multi-value processor 402 will be described. In these embodiments, multi-value processing of matrix density 255, in this case 8-bit image data, will be described.

Figure 5A:
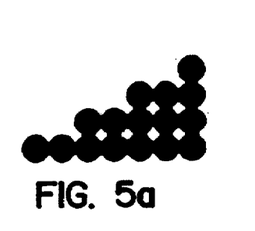
FIG. 5 shows multi-value conversion by the edge interpolation method.
Figure 5B:
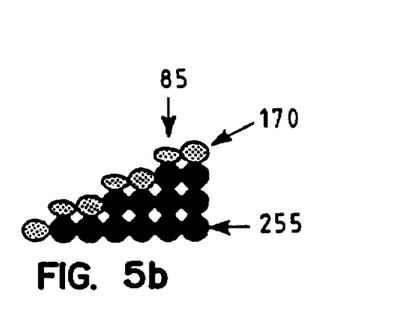

The multi-value processing of text/drawing data is executed by an edge interpolation filter. The process will be described in FIG. 5. FIG. 5(a) shows one part of text/drawing data. The edge of the text/drawing data is processed into multi-value data using, for example 3*3 dots pattern matching, as shown in FIG. 5(b). The text/drawing data is processed into middle densities 85 and 170. As a result, the jagged image of the edge can be reduced.

Figure 6A:
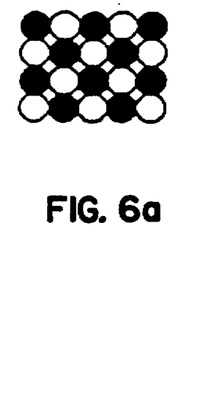
FIG. 6 shows multi-value conversion by the smoothing method.
Figure 6B:
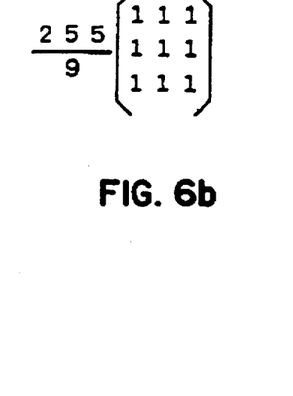
Figure 6C:
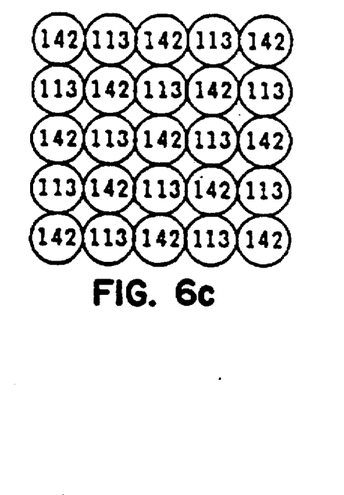

On the other hand, the multi-value processing of photograph/graphic data can be processed by a smoothing filter as shown in FIG. 6. FIG. (6) shows one of the smoothng filters. In this case, the binary image data in FIG. 6(a) is processed into middle densities 113 and 142 as shown in FIG. 6(c). The image in FIG. 6(c) is a uniform halftone image closer to an original image than the binary data image.

After the binary image data is processed to 8 bit image data by the above multi-value processing, the following manification process is executed.

Figure 7:
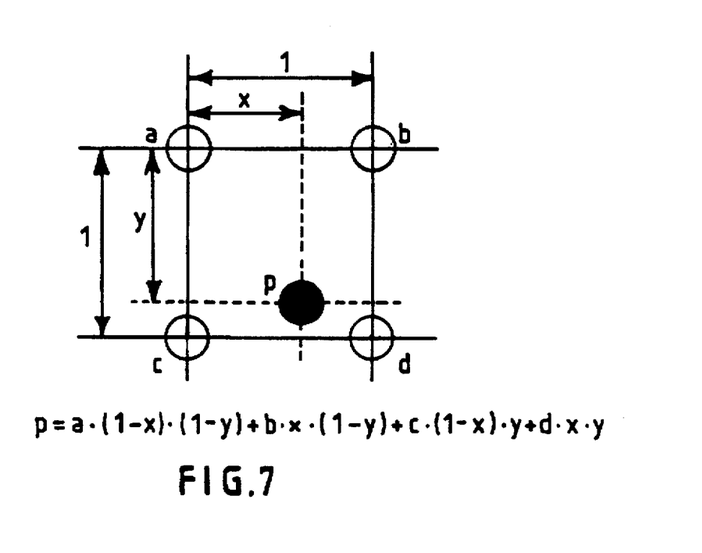
FIG. 7 shows magnification in both a horizontal direction and a vertical direction of multi-value data.
Figure 8A:
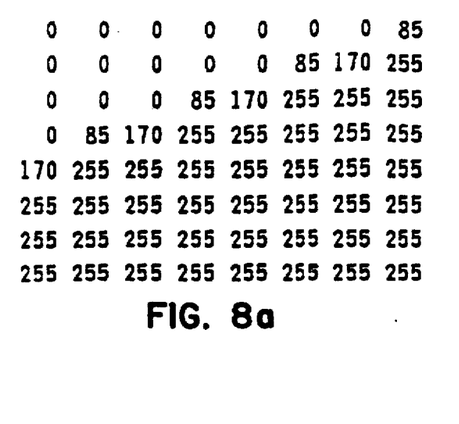
FIG. 8 shows multi-value image data and the result of magnification (reduction)
Figure 8B:
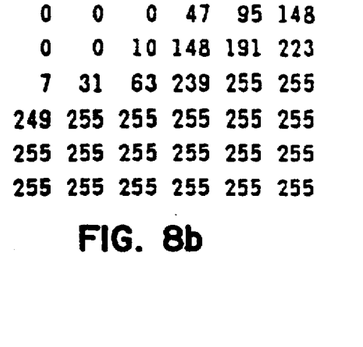
Figure 8C:
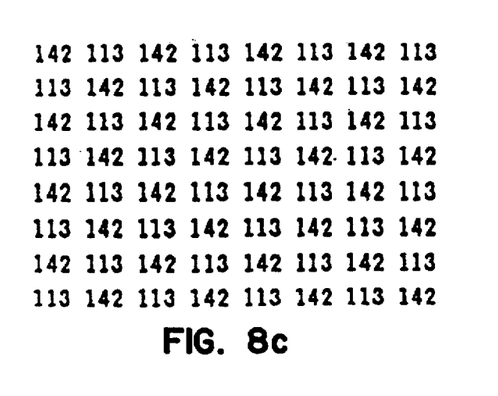

FIG. 7 shows the two directions (a horizontal and a veritical direction) for magnification processing. Data a, b, c and d are original data, and p is magnified (reduced) data. One calculation formula used is as follows:

$$p = a*(1-x)*(1-y) + b*x*(1-y) + c*(1-x)*y + d*x*y \qquad (1)$$

x: the magnification ratio in the horizontal direction y: the magnification ratio in the vertical direction FIG. 8(a) and (c) show the calculation results in which the pixels in FIG. 5(b) and FIG. 6(c) are converted respectively to numbers which represent the pixel densities. FIGS. 8(b) and (d) show the results in which FIGS. 8(a) and (c) are reduced to 75% images in the both horizontal and vertical directions.

Figure 8D:
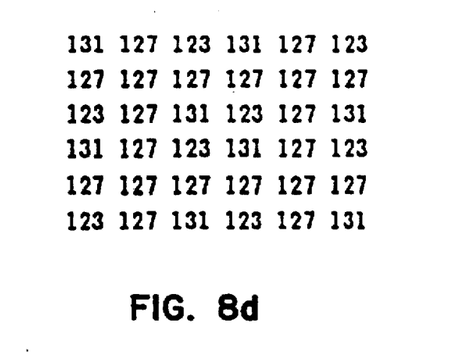
Figure 9A:
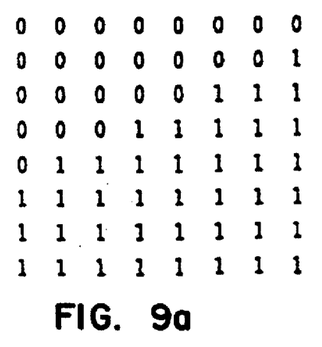
FIG. 9 shows binary image data and the result of magnification (reduction) of text/drawing image by conventional methods.
Figure 9B:
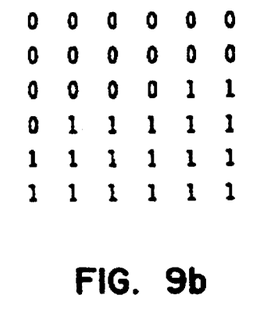
Figure 9C:
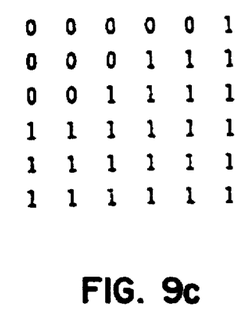
Figure 10A:
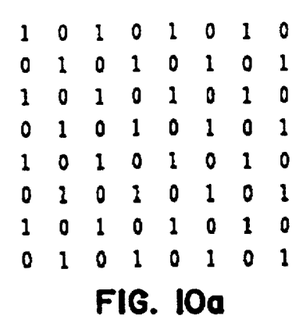
FIG. 10 shows binary image data and the result of the magnification (reduction) of photograph/graphics image by conventional methods.
Figure 10B:
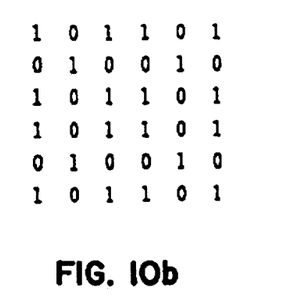
Figure 10C:
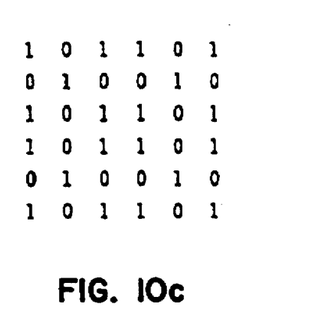

On the other hand, the result by the conventional magnification method, which is a magnification of binary image data, is shown in FIGS. 9 and 10 to compare with the present invention. FIG. 9(a) is an original binary text/drawing image and FIG. 10(a) is an original binary photograph/graphics image. FIGS. 9(b) and 10(b) show the result in which each original binary image is reduced to 75% image by the simple decimation method. FIGS. 9(c) and 10(c) show the result in which each original image is reduced by the SPC method. In FIGS. 9(b) and (c), the difference in level of the edge part of the text/drawings image is changed and the jagged image of the text/drawing image is not reduced compared to FIG. 8(b). In FIGS. 10(b) and (c), the texture of the photograph/graphics image is changed compared to FIG. 8(d). Moreover, though not shown in the Figures, lines can be reduced and more noise can occur.

However, in FIG. 8(b) which shows the result of magnification with multi-value image data by the present invention, the jagged image of the text/drawing image can be reduced. Moreover, the photograph/graphics image can be magnified without changing the texture of the image quality, as shown in FIG. 8(d).

Next, the printers which cannot print the result of the magnification with multi-value image data for example a laser printer, the following process is executed. The multi-value image data is executed by multi-value gradation and level correction in the gradation processor 406 so that the printer can print a stable dot. In this case, the process is also divided into two areas, one that handles text/drawing data and another that handles photograph/graphics data. The case in which a multi-value engine 110 can print a maximum 64 gradation will be described in this embodiment.

Figure 11A:
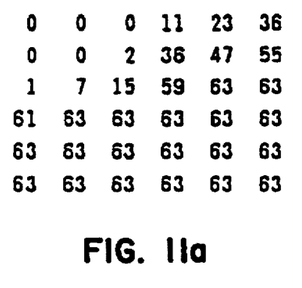
FIG. 11 shows gradation conversion and level correction to text/drawing data.
Figure 11B:
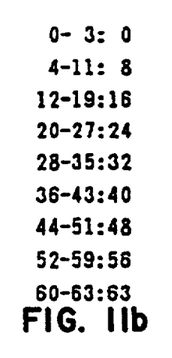
Figure 11C:
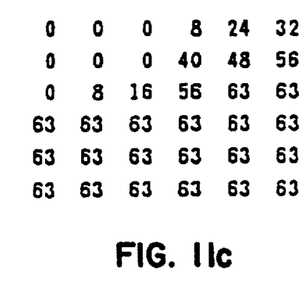

In handling text/drawing data, 256 gradation data is converted to 64 gradation data by the linear interpolation process, where the value of the data in FIG. 8(b) is multiplied by ¼ to produce FIG. 11(a). Then, for example, the data in FIG. 11(a) is converted to the data in FIG. 11(c) by level correction as shown in FIG. 11(b). This level correction is executed considering the gamma characteristics of the printer so that the interval of the densities of the edge part in FIG. 11(a) can be the same level. This correction considering the gamma characteristics can reduce jagged images.

Figure 12A:
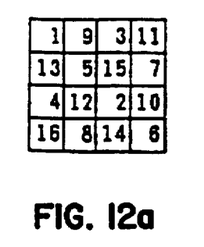
FIG. 12 shows gradation conversion and level correction to photograph/graphics data.
Figure 12B:
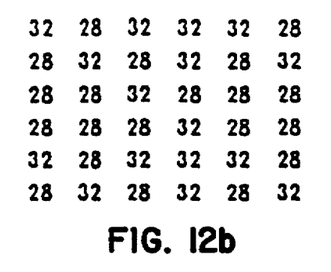
Figure 12C:
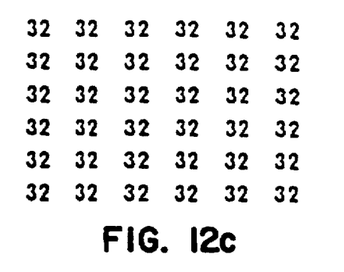

On the other hand, in handling photograph/graphics data, 256 gradation data is converted to 64 gradation data in FIG. 12(b) through, for example, a matrix having priority ranks in FIG. 12(a). Then the level correction in FIG. 11(b) is also executed on the data in FIG. 12(b) and the result is shown in FIG. 12(c). FIG. 12(c) is closer to an original image than FIG. 12(b), considering that the original image is a uniform halftone image.

Moreover, the content of the gradation conversion and the level correction to the text/drawing data and the photograph/ graphics data is changed in accordance with the type of multi-value engine 110. As a result, a stable image can be always printed in the multi-value engine 110.

In addition, as the above converter from binary image data to multi-value image data, and magnifier 400 are installed between the binary page memory 120 and the multi-value engine 110, the process in the converter from binary image data to multi-value image data and magnifier 400 can be executed in real time.

The technical advantage of this invention will be described.

First, in the above embodiments, the image processing apparatus which inputs binary image data and outputs multi-value image data, comprises an input device which inputs binary image data, a divider which divides the input binary image data into binary text/drawing data and binary photograph/graphics data, a multi-value processor in which the binary text/drawing data is converted to multi-value text/drawing data by a filter which interpolates an edge of an image and the binary photograph/grahics data is converted to multi-value photograph/graphics data by a filter which smooths an image, a mixer which mixes the multi-value text/drawing data and the multi-value photograph/graphics data together into multi-value data, and an output device which outputs the multi-value data. As a result, improvements in a text/drawing image, for example reducing jagged images, and the faithful reproduction of a photograph/ graphics original image can be achieved, when compared to a binary image.

Second, in the image processing apparatus, the process of the divider involves using a filter having the reading characteristic of a scanner and which converts the input binary image data to multi-value image data. A multi-value data identifier identifies the multi-value image data and outputs one code for text/drawing data and another code for photograph/graphics data. Then, the input binary image data is divided into the binary text/drawing data and the binary photograph/graphics data in accordance with these codes. As a result, because the multi-value data identifier is already installed in a digital copying machine, the cost for developing a new binary identifier can be reduced.

Third, in the image processing apparatus, it further comprises a magnifier which magnifies the multi-value data outputted from the multi-value processor. As a result, the magnification in both the horizontal and vertical directions can be achieved, and the image loss in a conventional apparatus which magnifies binary image data can be improved.

Finally, in the image processing apparatus, when an image is printed in some types of multi-value engines, gradation conversion and level correction to the text/drawing data and the photograph/graphics data are executed. The content of the gradation conversion and the level correction to the text/drawing data and the photograph/graphic data is changed in accordance with the type of a multi-value engine used. As a result, a stable image an always be printed in the multi-value engine.

Obviously, numerous modifications and variations of the present invention are possible in light of above teachings. It is therefore to be understood that, within the scope of the appended claims, the invention may be practiced otherwise than as specifcally described herein.

What is claimed is:

1. An image processing apparatus which inputs binary image data and outputs multi-value data, said apparatus comprising:

an input device which inputs binary image data;

a divider which divides the input binary image data;

a divider which divides the input binary image data into binary text/drawing data and binary photograph/ graphics data, the divider further including a binary data identifier that identifies the input binary image data and outputs a first code for text/drawing and a second code for photograph/graphics data, the input binary image data being divided into the binary text/drawing data and the binary photograph/graphics data in accordance with said first and second codes;

a multi-value processor in which the binary text/drawing data is converted to multi-value text/drawing data by a first filter which interpolates an edge of an image and the binary photograph/graphic data is converted to multi-value photograph/graphics data by a filter which smooths an image;

a mixer which mixes the multi-value text/drawing data and the multi-value photograph/graphic data together into multi-value data; and an output device which outputs the multi-value data.

2. The image processing apparatus of claim 1, further comprising a multi-value gradation processor which inputs multi-value text/drawing data of n bits and multi-value photograph/graphics data of n bits from the multi-value processor, and converts the text/drawing data and the photograph/graphics data of n bits to those m bits data respectively in accordance with a type of printer to which the m bits data is outputted from the output device, said gradation processor further correcting a level of each m bits data in accordance with the type of printer where n>m, n: integral number and m: integral number.

3. The image processing apparatus of claim 2, wherein the multi-value gradation processor further modifies the multi-value data and a level of the multi-value data.

4. The image processing apparatus of claim 1, wherein the multi-value processor converts the binary data into multi-value 8-bit data that is 256 value data.

5. The image processing apparatus of claim 1, further comprising a magnifier which magnifies the multi-value data outputted from the multi-value processor in both a horizontal direction and a vertical direction.

6. The image processing apparatus of claim 5, wherein the magnifier includes means for magnifying based on a formula $$p = a*(1-x)*(1-y) + b*x*(1-y) + c*(1-x)*y + d*x*y$$

where p: magnified multi-value, data a, b, c and d: original multi-value data, x: magnification ratio in the horizontal direction and y: magnification ratio in the vertical direction.

7. The image processing apparatus of claim 1, wherein the divider includes a filter having a reading characteristic of a scanner that converts the input binary image data to multi-value image data, and a multi-value data identifier that identifies the multi-value image data, and outputs a first code for text/drawing data and a second code for photograph/graphics data, such that the input binary image data is divided into the binary text/drawing data and the binary photograph/graphic data in accordance with said first and second codes.

8. An image printing apparatus comprising:

a memory which stores binary image which is transmitted from another apparatus;

a divider which divides the binary image data from the memory into binary text/drawing data and binary photograph/graphics data, the divider further including a binary data identifier that identifies the input binary image data and outputs a first code for text/drawing and a second code for photograph/graphics data, the input binary image data being divided into the binary text/drawing data and the binary photograph/graphics data in accordance with said first and second codes;

a multi-value processor in which the binary text/drawing data is converted to multi-value text/drawing data by a first filter which interpolates an edge of an image and the binary photograph/graphics data is convened to multi-value photograph/graphics data by a second filter which smooths an image;

a mixer for combining the multi-value text/drawing data and the multi-value photograph/graphics data together into multi-value data;

an output device which outputs the multi-value data; and a printer which prints a multi-gradation image in accordance with the multi-value data.

* * * * *